Feb. 2, 1954 P. B. SILK 2,667,848
CONTINUOUS SLAG REMOVAL APPARATUS FOR
PRESSURE-FIRED COMBUSTION APPARATUS
Filed Sept. 29, 1949 4 Sheets-Sheet 1

INVENTOR
Philip B. Silk
BY
*J. P. Moran*
ATTORNEY

Feb. 2, 1954 P. B. SILK 2,667,848
CONTINUOUS SLAG REMOVAL APPARATUS FOR
PRESSURE-FIRED COMBUSTION APPARATUS
Filed Sept. 29, 1949 4 Sheets-Sheet 4

INVENTOR
Philip B. Silk
BY
ATTORNEY

Patented Feb. 2, 1954

2,667,848

UNITED STATES PATENT OFFICE 2,667,848

CONTINUOUS SLAG REMOVAL APPARATUS FOR PRESSURE-FIRED COMBUSTION APPARATUS

Philip Baxter Silk, London, England, assignor to The Babcock & Wilcox Company, Rockleigh, N. J., a corporation of New Jersey Application September 29, 1949, Serial No. 118,694

Claims priority, application Great Britain October 29, 1948

15 Claims. (Cl. 110—165)

This invention relates to combustion apparatus and, more particularly, to apparatus for continually withdrawing molten ash or slag from a furnace or combustion chamber arranged to burn an ash-containing fuel under pressure.

Furnaces operating under pressure are used, for example, to supply heated gases to gas turbines operating on the open cycle, and the rates of heat release in such furnaces are twenty to thirty times those obtaining in the usual furnace for boilers or vapor generators. In view of the pressures involved, the size of furnace for supplying a gas turbine is, for practical considerations, limited, thus necessitating such high rates of heat release.

To reduce the gas temperature to a practical operation limit, such as 1200 F., for example, a considerable amount of excess air is added to the products of combustion before the latter enter the turbine. When a liquid fuel is used, the excess or diluting air is used to cool the combustion chamber, which generally comprises an unlined, double walled metal pot. When solid fuel is burned in such a furnace, the high rates of heat release can be realized if the fuel is pulverized or crushed to small size. If the excess or diluting air is then used to reduce the combustion gas temperature, the whole of the incombustible constituents of the solid fuel will pass out of the combustion chamber as fine, highly abrasive dust. To protect the turbine from excessive abrasion, these combustible constituents must be separated from the combustion gases before the latter enter the turbine.

The problem of so separating the combustible constituents is one of considerable magnitude. The dust catchers required between the combustion chamber and the turbine would be large and costly, since they must handle not only the suspended dust but also the total volume of the air and combustion gas mixture going to the turbine. Aside from these considerations, a liberal design of the dust catchers is necessary in order to minimize resistance to the flow of the gas and air mixture, since a 2% drop in pressure through the dust catchers may lead to a loss of 1%, or more, in the overall thermodynamic efficiency. Generally, therefore, such dust catchers would have to be 50% larger than would be necessary for a normal pressure fired boiler or vapor generator burning fuel at the same rate.

Having in mind the foregoing factors, the solution of the problem lies in the employment of a slagging type combustion chamber. Using this type of furnace, the dust catchers are required to deal with only 20% of the dust, as the remainder of the dust is slagged, and diluting air would not be required around the combustion chambers for cooling purposes. The copending application of Christopher H. Davy and Thomas B. Webb, Serial No. 773,396, filed September 11, 1947, for "Gas Turbine Plant," now Patent No. 2,616,256, shows and describes an arrangement in which a proportion of the incombustible matter is separated as molten slag, with the advantage that the work required of the dust catchers, in effecting cleaning of the gases before reaching the turbine, is substantially reduced.

However, the withdrawal or tapping of the molten slag from the combustion chamber presents considerable difficulty, particularly where the combustion chamber operates under pressure, say of 100 p. s. i. If it were possible to shut down the unit once or twice a day, the slag could be removed at atmospheric pressure, as is done in the usual pressure fired boiler, and there would be no untoward slag handling problems. Nevertheless, continuous slag removal has been found desirable, and is necessary in the operation of the small size high pressure combustion chambers, used to supply gas turbines, due to their consequently small slag accumulation capacity.

If the method presently used successfully for continuous slag tapping of furnaces is used, that is, collection of the slag in a water filled tank below the slag spout, then the tank will have to be sealed and designed to withstand an internal pressure of the order of that in the furnace. While this does not involve any unusual difficulties, normal methods of emptying the tank could not be used. To empty the tank, a large size, fully openable valve would be required. Under such circumstances, the tank would empty in a matter of seconds, practically an explosion. Furthermore, if entry of hot high pressure gas into the slag conveying system is to be avoided, the valve would have to be shut simultaneously with the completion of the tank emptying operation. For these reasons, such a slag withdrawal arrangement is impractical.

In accordance with the present invention, the foregoing difficulties in continuous withdrawal of molten slag from a combustion chamber under pressure are eliminated by providing a first or primary sealed tank containing water into which the molten slag drips continuously from a furnace slag discharge spout. A sealed valve connection is provided between this primary tank and a secondary sealed tank which is normally empty and at atmospheric pressure, and of such size that, when practically the whole content of the primary tank has passed into the secondary tank, the air in the latter will be compressed to the pressure within the primary tank.

When sufficient slag has accumulated in the primary tank, the valve in the connection is opened to pass the slag to the secondary tank. The gradually increasing flow resistance, due to the air pressure increase in the secondary tank, progressively slows the rate of slag transfer and allows the transfer to extend over a measurable period. When the discharge into the secondary tank is completed, the transfer valve need not be closed immediately, as the pressure in the two tanks is equalized and substantially equal to the furnace pressure.

The slag can be discharged from the secondary tank in either of two manners. In the first instance, a discharge valve controlling slag flow to a conveying system can be opened, with the secondary tank still being under high pressure. The discharge, due to the high pressure, will be rapid at first, but will soon slow down as the pressure in the secondary tank drops toward atmospheric. In an alternative method of discharging, a pressure relief valve on the top of the secondary tank can be opened to vent the air therein to reduce the internal tank pressure to atmospheric. The discharge valve can then be opened and the contents of the secondary tank discharged by any of the standard methods of feeding material from hoppers or tanks. In either case, after the discharge is completed, the discharge valve is closed and the cycle is complete. In the second method of discharge, the pressure relief valve is closed when the pressure in the secondary tank has been reduced to atmospheric.

In order to avoid boiling of the water in the primary tank when the molten slag is discharged thereinto, cooling of the water is necessary. In boiler practice, a continuous flow of water through the slag receiving tank is maintained by introducing cold water at the bottom of the tank and allowing the hot water at the top to overflow to waste. The same procedure can be followed with the slag discharge system of the present invention but, owing to the pressure under which the primary tank operates, the overflow would have to be through a float valve or through an automatic overflow control arrangement. In either case, it is desirable to connect the overflow to a small "blow down" tank.

An alternate arrangement is to line the primary tank with a cooling coil and use a level responsive control to indicate the time when the tank should be emptied, or to automatically control emptying of the primary tank.

A further feature enhancing the operation of the invention system is the formation of the bottoms of the two tanks as swirl chambers, as by forming annular troughs in the bases of the tanks. In such arrangement, the make-up water connection to the primary tank is directed tangentially to the annular trough therein so as to set up a swirl to help distribute the quenched slag around the periphery of the tank, rather than allowing it to settle in one spot. The discharge connection between the two tanks is also tangential to the two swirl chambers, but arranged in the primary tank to provide a swirl in a direction opposite to that provided by the make-up water. Thereby, the make-up water will not force the slag into the discharge opening and clog the latter during the period when discharge is not taking place. The entry and discharge to the secondary tank are also tangentially arranged to give opposing directions of swirl.

The invention is not limited to any particular spatial relation of the tanks, and numerous modifications of the inter-connections of the tanks may be provided within the scope of the invention. For example, full or semi-automatic operation of the system can be effected with the two discharge valves inter-locked in order to insure that both valves can not be opened at the same time. Also, an external pump can be used to extract hot water from the secondary tank and return it through a cooler to the primary tank. With such arrangement, the connection between the two tanks can be kept open and the slag washed continuously from the primary tank to the secondary tank. If necessary or desirable, a slag pump may be interposed in the connection between the two tanks to assist the movement of slag into the secondary tank. The latter, if desired, may be formed as an overhead bunker where it is impractical or undesirable to use a sluicing system. The slag in the bunker can be de-watered in the customary manner and dumped directly into trucks. Of course, the bunker should be constructed of material capable of withstanding the full pressure of the furnace and the primary tank.

With the foregoing in mind, it is an object of the present invention to provide an improved system for continuously removing slag from a combustion chamber operating under an elevated pressure.

Another object is to provide such a system which is relatively simple in construction, easy to operate and substantially fool-proof.

A further object is to provide such a system in which entry of hot, high pressure gas into the slag handling apparatus is effectively inhibited.

Still another object of the invention is to provide such a system in which the discharge of the slag can be effectively controlled.

These and other objects, advantages, and novel features of the invention will be apparent from the following description and the accompanying drawings.

Figure 2:
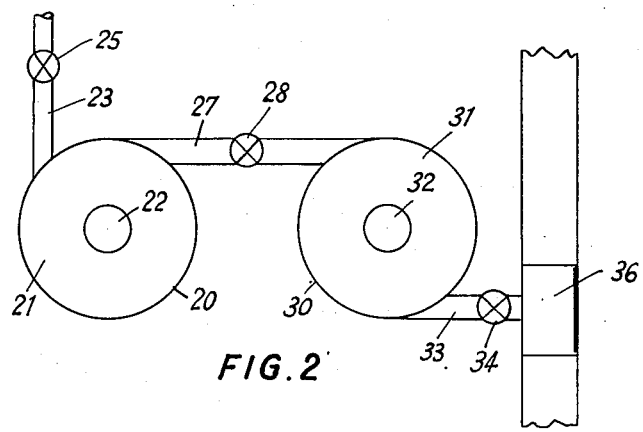
Fig. 2 is a horizontally longitudinal sectional view on the line 2—2 of Fig. 1.
Figure 1:
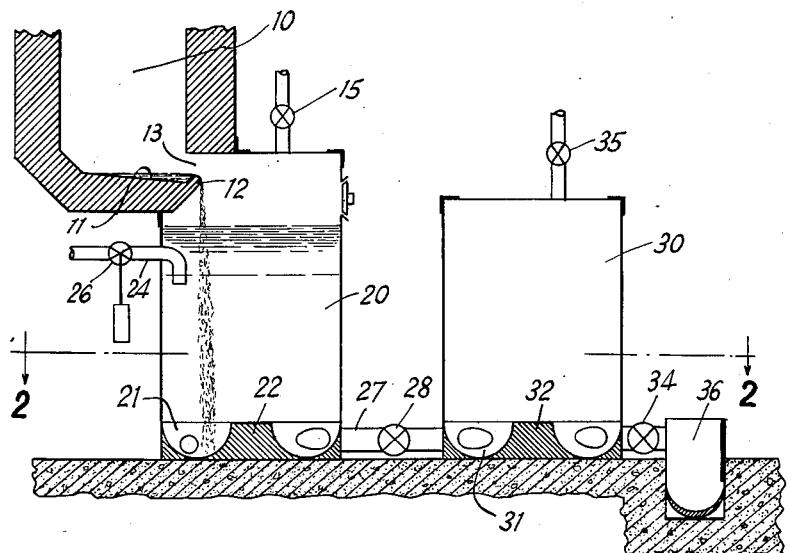
Fig. 1 is a vertical longitudinal sectional view through a continuous slag discharge system according to the present invention.

Referring first to Figs. 1 and 2, molten slag from a combustion chamber or furnace 10, which is fired under pressure, collects in a recess 11 at the base of the furnace and drips continuously over a lip 12, at the bottom of an opening 13, into a pressure sealed primary tank 20. A valve 15 is provided for continuously bleeding-off a small amount of hot gas through the slag spout or aperture 13 to prevent freezing of the slag at this point.

The bottom of tank 20 is formed as a swirl chamber comprising an annular trough 21 surrounding a central protuberance 22. Make-up water is directed tangentially into trough 21 to provide a counterclockwise swirl therein, as viewed in Fig. 2, by means of a pipe 23 controlled by a valve 25. Overflow water is discharged from tank 20 through an overflow connection 24 controlled by a suitable valve 26.

Tank 20, and more particularly swirl trough 21 thereof, is connected to secondary tank 30 by means of a discharge pipe or conduit 27 controlled by a valve 28. Pipe 27 opens tangentially into trough 21 but is so directed that the swirl, during discharge, will be clockwise of trough 21, as viewed in Fig. 2. Secondary tank 30 is likewise a pressure sealed tank constructed to withstand the operating pressure of furnace 10. Its base is formed to provide a swirl chamber including an annular trough 31 surrounding a central protuberance 32. Pipe 27 opens into trough 31 tangentially in such direction as to provide a clockwise directed swirl therein, as viewed in Fig. 2, during discharge from tank 20 into tank 30. A pressure relief valve 35 is connected to the top wall of tank 30, for a purpose to be described. Discharge from tank 30 is effected through a pipe 33 controlled by a valve 34 and discharging to a sluice-way 36. Pipe 33 opens tangentially into trough 31 in such a direction that a counterclockwise swirl, as viewed in Fig. 2, is set up during discharge of the slag from tank 30.

The arrangement shown in Figs. 1 and 2 operates in the following manner. The slag drops continuously into the primary sealed tank 20, no valve or plug being required at the slag spout. The small amount of hot gas bled off continuously through the slag spout and valve 15 prevents freezing of the slag at the spout. Secondary sealed tank 30, at this time, is empty and at substantially atmospheric pressure, which condition can be effected by opening valve 35 until the pressure within tank 30 has dropped to atmospheric, and then closing valve 35. During the continuous flow of slag into tank 20, the make-up water entering through pipe 23 sets up a counterclockwise swirl in trough 21 to distribute the quenched slag around the periphery of tank 20. Due to the direction of the opening into pipe 27, the make-up water will not force the slag into pipe 27 and thus will not clog the latter during periods when slag discharge is not taking place.

When sufficient slag has collected in tank 20, valve 28 is fully opened, whereupon the slag is forced, by the pressure in tank 20, to flow through pipe 27 and valve 28 into tank 30. The swirl set up by the discharge effectively scours the slag from trough 21, and the swirl in trough 31 distributes the slag uniformly around the periphery of tank 30. The gradually increasing resistance to slag flow, due to the compression of air in tank 30, progressively slows down the rate of slag flow and thus allows the discharge operation to extend over a measurable period. Tank 30 is of such a size that, when practically all of the contents of tank 20 has passed into tank 30, the air in the latter will be compressed to the same pressure as in tank 20. This is the pressure of combustion chamber 10, which may be of the order of 100 p.s.i.

When the discharge has been completed and the two tanks are at substantially the same pressure, valve 28 is fully closed, sealing tank 20 from tank 30. Closure of this valve may be easily effected inasmuch as the pressures on both sides thereof are equalized.

In one method of discharge from tank 30, valve 34 is opened and the air compressed in tank 30 discharges the slag into pipe 33 and through valve 34 into sluice-way 36. This discharge, while rapid at first, soon slows up as the pressure in tank 30 decreases toward atmospheric.

Alternatively, after valve 28 has been closed, valve 35 may be opened to bleed the air in tank 30 to atmosphere. When the pressure within tank 30 is substantially atmospheric, valve 34 is opened and the slag discharged by any of the methods customarily used for feeding from hoppers. When the discharge into sluice 36 is completed, valves 34 and 35 are reclosed. During the discharge from tank 30, the tangential relation of pipe 33 to trough 31 sets up a counterclockwise swirl within the trough to scour the slag therefrom.

Figure 3:
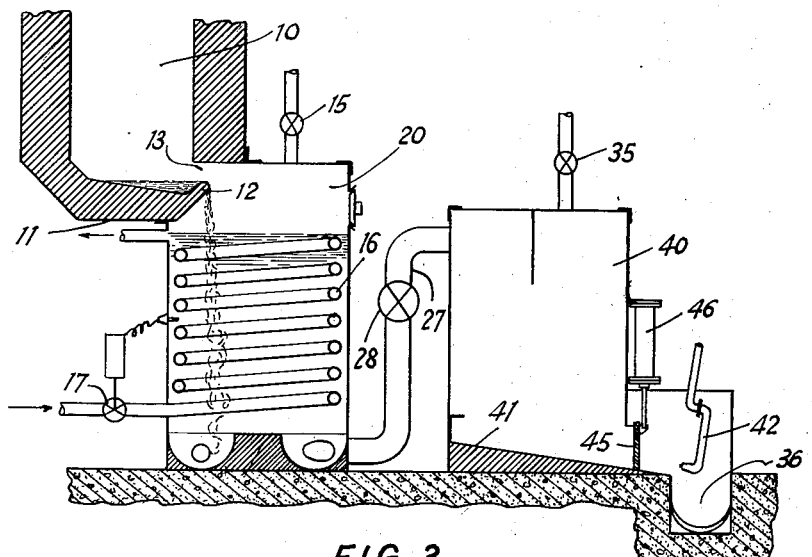
Fig. 3 is a longitudinal sectional view through a modified embodiment of the slag handling system shown in Fig. 1.

In the arrangement shown in Fig. 3, the quenching liquid in primary tank 20 is cooled by means of an external source of low pressure water flowing through a coil 16 within tank 20. The cooling water flow is regulated by a thermostat controlled valve 17 in accordance with the temperature of the quenching liquid or water within tank 20.

In this arrangement, secondary tank 40 differs in construction from the secondary tank 30 of Figs. 1 and 2. Specifically, tank 40 has a sloping feed plate 41 from which slag may be discharged through a gate valve 45 operated by a hydraulic cylinder 46. A standard type of "feed nozzle" 42 is arranged to direct its flow against gate valve 45 and along plate 41. Discharge pipe 27, in this case, enters tank 40 near the top. This assures that there can be no return flow from tank 40 to tank 20 in the event of there being insufficient water in tank 20, which is a possibility with bottom entry of pipe 27 into tank 30, as shown in Figs. 1 and 2.

In the arrangement of Fig. 3, discharge from tank 20 into tank 40 is effected in substantially the same manner as in Figs. 1 and 2. With tank 40 at substantially atmospheric pressure and empty, valve 28 is opened to discharge the slag into tank 40. When the pressure in the two tanks is substantially equal, the discharge stops and valve 28 is closed. The pressure is then released or bled off through valve 35, and gate valve 45 is then opened. It should be noted that, although valve 45 must be designed to withstand the operating pressure of furnace 10, it is opened and shut only when there is equal pressure (atmospheric) on each side of valve 45.

Figure 4:
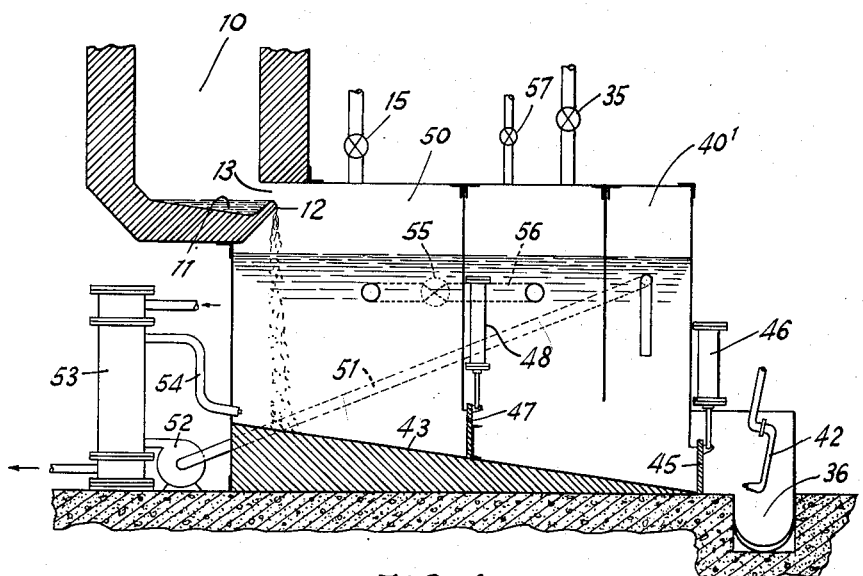
Fig. 4 is a longitudinal sectional view through a further modified form of the slag handling system.

In the arrangement illustrated in Fig. 4, both primary sealed tank 50 and secondary sealed tank 40' are of the "feed plate" type and both are kept substantially filled with water. As shown, a sloping feed plate 43 extends through both tanks. Intercommunication between the two tanks is controlled by a gate valve 47 operated by a hydraulic cylinder 48 and designed to withstand the pressure of furnace 10. A pipe 51 extracts hot water from tank 40' and directs it to a pump 52, which circulates the water through a cooler 53 from which the cold water is directed to tank 50 through a pipe 54. An equalizing connection 56 controlled by a valve 55 may be provided between the two tanks.

This arrangement may be operated in either of two different manners. The slag may be continuously collected in tank 50 and periodically discharged into tank 40' through valve 47. With such arrangement, valve 55 would remain open to equalize the water level in the two tanks. Alternately, valve 47 may remain open so that the slag may be continuously washed therethrough from tank 50 into tank 40'. In the latter method, the equalizing valve 55 would be kept closed. In either case, slag is discharged from tank 40' by closing valve 47, venting tank 40' to atmosphere through valve 35 and opening valve 45. Make-up water is added, in this instance, through a valve 57 controlling water flow into tank 40'.

Figure 5:
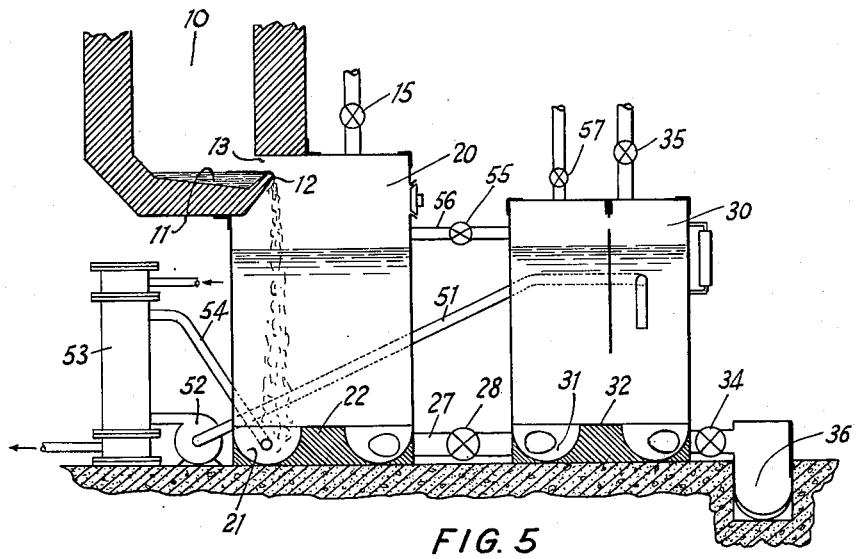
Fig. 5 is a longitudinal sectional view through a still further modified form of the slag handling system.

The arrangement of Fig. 5 operates in substantially the same manner as that of Fig. 4. However, the tanks 20 and 30 are the same as those in the system of Figs. 1 and 2. Again, both tanks are kept substantially filled with water, which is circulated from tank 30 through pipe 51, pump 52, cooler 53, and pipe 54 into tank 20. Pipe 54 is tangentially directed into trough 21 in the same manner as pipe 23 of Fig. 2. A pressure balance connection 56, controlled by a valve 55, is provided in the same manner as in Fig. 4, as is also a make-up valve 57.

Figure 6:
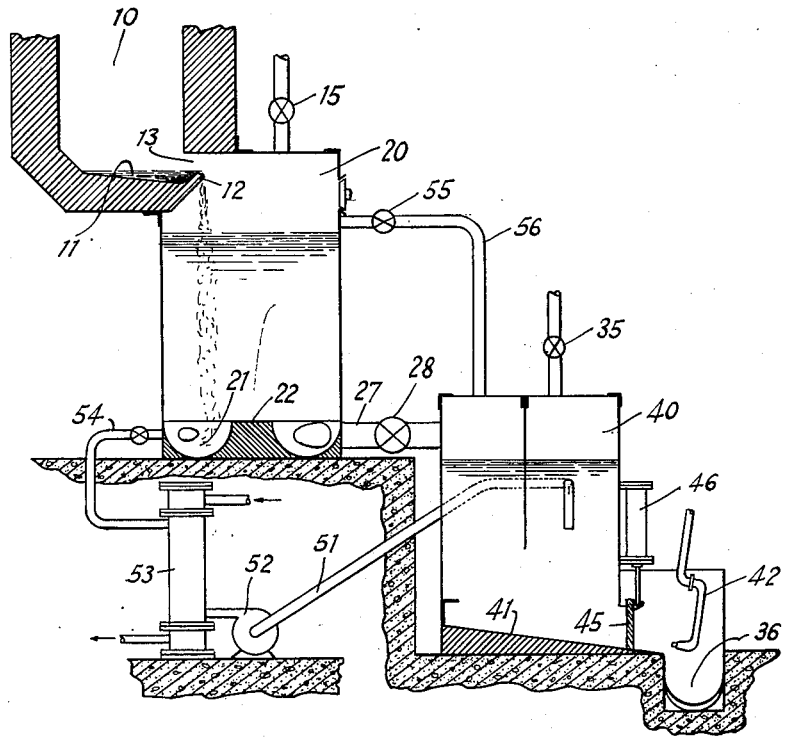
Figs. 6 and 8 are longitudinal sectional views illustrating a slag handling system with the two disposal tanks on different levels.

Fig. 6 illustrates an arrangement substantially the same as that of Fig. 1, and a secondary tank 40, substantially the same as that of Fig. 3. In this arrangement, the secondary tank is arranged at a lower level than the primary tank, so that the discharge from the primary tank can enter the secondary tank at the top, thus preserving the back-flow-preventing advantage of the arrangement of Fig. 3 without requiring the vertically extending pipe 27 of Fig. 3. A water circulating arrangement similar to that of Figs. 4 and 5 is used.

Figure 7:
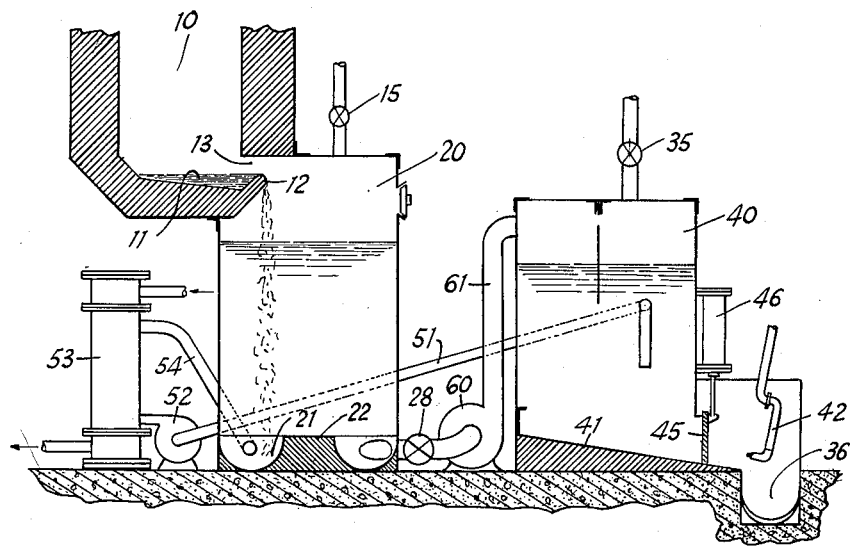
Fig. 7 is a longitudinal sectional view showing a modification of the arrangement shown in Fig. 3.

In some installations, it is desirable or advantageous to use a pump for discharging the slag from the primary tank into the secondary tank. Such an arrangement is shown in Fig. 7 wherein the discharge from tank 20 into tank 30 is effected through a valve 28 at the inlet to an ash pump 60, and a pipe 61 extends from the discharge of pump 60 to the top of tank 40. All of the pumps of the several modifications thus far described need generate only a very low head, such as a head of a very few feet. The pressure within furnace 10 does not enter into consideration, as the pressure head is the same at both the suction and discharge of the pumps. The casings, glands, etc., of the pumps will naturally have to withstand the furnace pressure.

Figure 8:
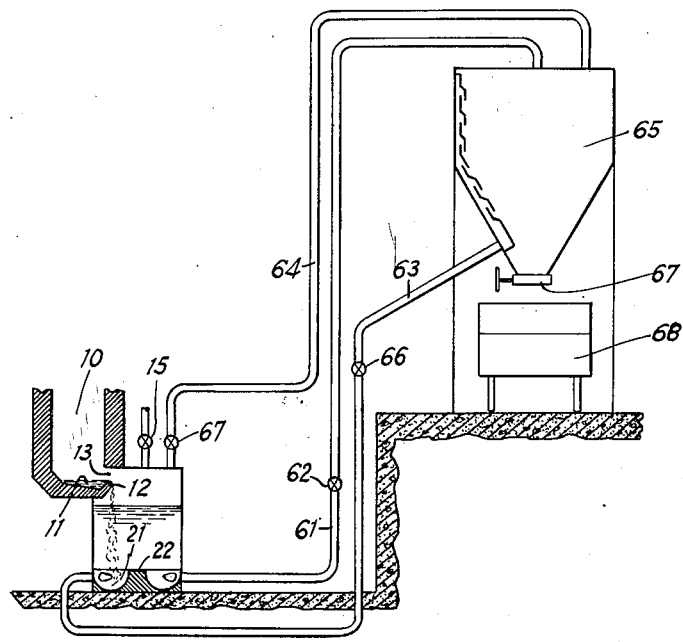

In the arrangement of Fig. 8, the pressure sealed secondary tank is replaced by an overhead bunker 65, which is useful for installations where it is impractical or undesirable to use a sluicing system. Once the slag is in bunker 65, it can be de-watered in the usual manner and dumped directly into trucks, such as shown at 68, through a controlled hopper opening 67. Discharge of the slag water mixture to the overhead bunker is effected by utilizing the pressure in primary tank 30 to force the mixture through a line 61 controlled by a valve 62, or an ash pump, as shown in Fig. 7, can be installed in line 61. The water circulating system includes the lines 63 and 64 controlled by valves 66 and 67. With either method of transferring the slag water mixture from the primary sealed tank 30 to bunker 65, the latter must be constructed of suitable material to withstand, at certain periods, the full pressure of furnace 10.

While specific embodiments of the invention have been shown and described in the drawings to illustrate the invention principles, it should be understood that the invention may be embodied otherwise without departing from such principles.

I claim:

1. Combustion apparatus comprising, in combination, a combustion furnace arranged to be fired under superatmospheric pressure by an ash-containing fuel with collection of the ash in molten form; a first closed chamber in sealed communication with said furnace, said furnace being arranged to continuously discharge molten ash into said chamber; means for supplying liquid to said first chamber to receive and quench the molten slag discharged thereinto; a second closed chamber; a valved connection between said chambers to transfer slag to said second chamber; and a valved outlet from said second chamber for periodically removing slag therefrom; said second chamber being of such size that, when said valved connection is open, air at atmospheric pressure in said second chamber will be compressed to the furnace pressure by transfer of liquid and slag to said second chamber while said valved outlet is closed and covered with liquid; said valved connection being operable to isolate said second chamber from said first chamber.

2. Combustion apparatus comprising, in combination, a combustion furnace arranged to be fired under superatmospheric pressure by an ash-containing fuel with collection of the ash in molten form; a first closed chamber in sealed communication with said furnace, said furnace being arranged to continuously discharge molten ash into said chamber; means for supplying liquid to said first chamber to receive and quench the molten slag discharged thereinto; a second closed chamber; a valved connection between said chambers to transfer slag to said second chamber; a valved outlet from said second chamber for periodically removing slag therefrom; second chamber being of such size that, when said valved connection is open, air at atmospheric pressure in said second chamber will be compressed to the furnace pressure by transfer of liquid and slag to said second chamber while said valved outlet is closed and covered with liquid; said valved connection being operable to isolate said second chamber from said first chamber during such periodic slag removal; and a pressure relief valve operatively associated with said second chamber to reduce the pressure therein to atmospheric while said valved connection is closed and before said valved outlet is open, whereby the slag may be removed at atmospheric pressure from said second chamber.

3. Combustion apparatus comprising, in combination, a combustion furnace arranged to be fired under superatmospheric pressure by an ash-containing fuel with collection of the ash in molten form; a first closed cylindrical chamber in sealed communication with said furnace and having an annular peripheral trough formed in the inner surface of its base, said furnace being arranged to continuously discharge molten ash into said chamber; means for directing a supply of liquid tangentially into said trough to receive and quench molten slag discharged into said first chamber and to generate a scouring swirl in said trough; a second closed cylindrical chamber having an annular peripheral trough formed in the inner surface of its base; a valved connection between said chambers to transfer slag to said second chamber, said connection opening tangentially into each of said annular troughs; said valved connection and said liquid supply means opening tangentially in the same direction into the annular trough of said first chamber whereby swirls in opposite directions are set up, respectively, during supply of liquid to said first chamber and during discharge of liquid and slag therefrom; and a valved outlet from said second chamber for periodically removing slag therefrom, said valved connection and said valved outlet opening tangentially in the same direction into the annular trough of said second chamber whereby swirls in opposite directions are set up, respectively, during supply of liquid and slag to said second chamber and during discharge of liquid and slag therefrom; said valved connection being operable to isolate said second chamber from said first chamber during such periodic slag removal.

4. Combustion apparatus comprising, in combination, a combustion furnace arranged to be fired under superatmospheric pressure by an ash-containing fuel with collection of the ash in molten form; a first closed cylindrical chamber in sealed communication with said furnace and having an annular peripheral trough formed in the inner surface of its base, said furnace being arranged to continuously discharge molten ash into said chamber; means for directing a supply of liquid tangentially into said trough to receive and quench molten slag discharged into said first chamber and to generate a scouring swirl in said trough; a second closed chamber having an annular peripheral trough formed in the inner surface of its base; a valved connection between said chambers to transfer slag to said second chamber, said connection opening tangentially into each of said annular troughs; said valved connection and said liquid supply means opening tangentially in the same direction into the annular trough of said first chamber; and a valved outlet from said second chamber for periodically removing slag therefrom; said valved connection being operable to isolate said second chamber from said first chamber during such periodic slag removal.

5. Combustion apparatus comprising, in combination, a combustion furnace arranged to be fired under superatmospheric pressure by an ash-containing fuel with collection of the ash in molten form; a first closed chamber in sealed communication with said furnace, said furnace being arranged to continuously discharge molten ash into said chamber; means for supplying cold liquid to the bottom of said first chamber to receive and quench the molten slag discharged thereinto; means for withdrawing hot liquid from the upper portion of said first chamber; a second closed chamber arranged to receive slag from said first chamber; means for periodically removing slag from said second chamber; and means operable to isolate said second chamber from said first chamber during such periodic slag removal.

6. Combustion apparatus comprising, in combination, a combustion furnace arranged to be fired under superatmospheric pressure by an ash-containing fuel with collection of the ash in molten form; a first closed chamber in sealed communication with said furnace, the latter being arranged to continuously discharge molten ash into said chamber through a discharge port; means for supplying liquid to said first chamber to receive and quench the molten slag discharged thereinto; means controllably venting said first closed chamber to maintain a flow of furnace gases through said port; a second closed chamber; a connection extending from a lateral outlet near the bottom of said first closed chamber to a lateral inlet beneath the roof of said second closed chamber to deliver liquid and slag from said first closed chamber to said second closed chamber; vent means in the roof of said second chamber; a normally closed valve in said connection between said chambers; and a normally closed outlet adjacent the bottom of said second chamber; said valve, when opened, while the outlet and vent means of said second chamber are closed, providing for the superatmospheric pressure in said first chamber to force liquid and slag therefrom into the second chamber until the air beneath the roof of the said second chamber has been compressed to substantially the pressure existing in said first chamber and furnace; said second chamber vent means being operable to controllably vent air therefrom, after said valve has been reclosed, to reduce the pressure in said second chamber to atmospheric while the second chamber outlet is closed; whereby, the second chamber outlet may subsequently be opened to discharge liquid and slag from the second chamber at substantially atmospheric pressure.

7. Combustion apparatus as claimed in claim 6 including cooling means operable to maintain the quenching liquid in said first chamber below its vaporization temperature.

8. Combustion apparatus as claimed in claim 6 including a fluid heat exchanger immersed in the liquid in said first chamber; means for circulating a cooling fluid through said exchanger; and means, responsive to the temperature of the quenching liquid, controlling the operation of said circulating means.

9. Combustion apparatus as claimed in claim 6 including a sloping feed plate in the bottom of said second chamber, the outlet of said second chamber comprising a gate valve at the discharge end of said feed plate; and means for directing a discharge jet along said feed plate.

10. Combustion apparatus as claimed in claim 6 including means for supplying a liquid to said second chamber; a liquid level equalizing connection between said chambers; a fluid heat exchanger; and means for withdrawing hot liquid from said second chamber, circulating the same through said exchanger, and returning cooled liquid to said first chamber.

11. Combustion apparatus as claimed in claim 6 including means for supplying a liquid to said second chamber; a liquid level equalizing connection between said chambers; a fluid heat exchanger; means for withdrawing hot liquid from said second chamber, circulating the same through said exchanger, and returning cooled liquid to said first chamber; a sloping feed plate extending through both chambers toward the outlet of said second chamber, said valve in said connection and said normally closed outlet of said second chamber comprising gate valves; and means for directing a discharge jet along said feed plate through said outlet of said second chamber.

12. Combustion apparatus as claimed in claim 6 including a pressure balancing connection between said chambers; means for supplying a liquid to said second chamber; a fluid heat exchanger; and means for withdrawing hot liquid from said second chamber, circulating the same through said exchanger, and returning cooled liquid to said first chamber.

13. Combustion apparatus as claimed in claim 6 in which the normally closed valved connection between said chambers includes an ash pump for effecting flow of ash from said first chamber to said second chamber.

14. Combustion apparatus as claimed in claim 6 in which said connection connects the lower portion of said first chamber to the upper portion of said second chamber.

15. Combustion apparatus as claimed in claim 6 in which said connection connects the lower portion of said first chamber to the upper portion of said second chamber and extends substantially horizontally between said chambers.

PHILIP BAXTER SILK.

References Cited in the file of this patent

UNITED STATES PATENTS

| Number | Name | Date |
|---|---|---|
| 1,914,991 | Coghlan | June 20, 1933 |
| 1,957,583 | Foresman | May 8, 1934 |
| 2,163,148 | Linder | June 20, 1939 |
| 2,252,501 | Foresman | Aug. 12, 1941 |
| 2,346,068 | Foresman | Apr. 4, 1944 |
| 2,375,436 | Noack | May 8, 1945 |